Patented Mar. 10, 1931

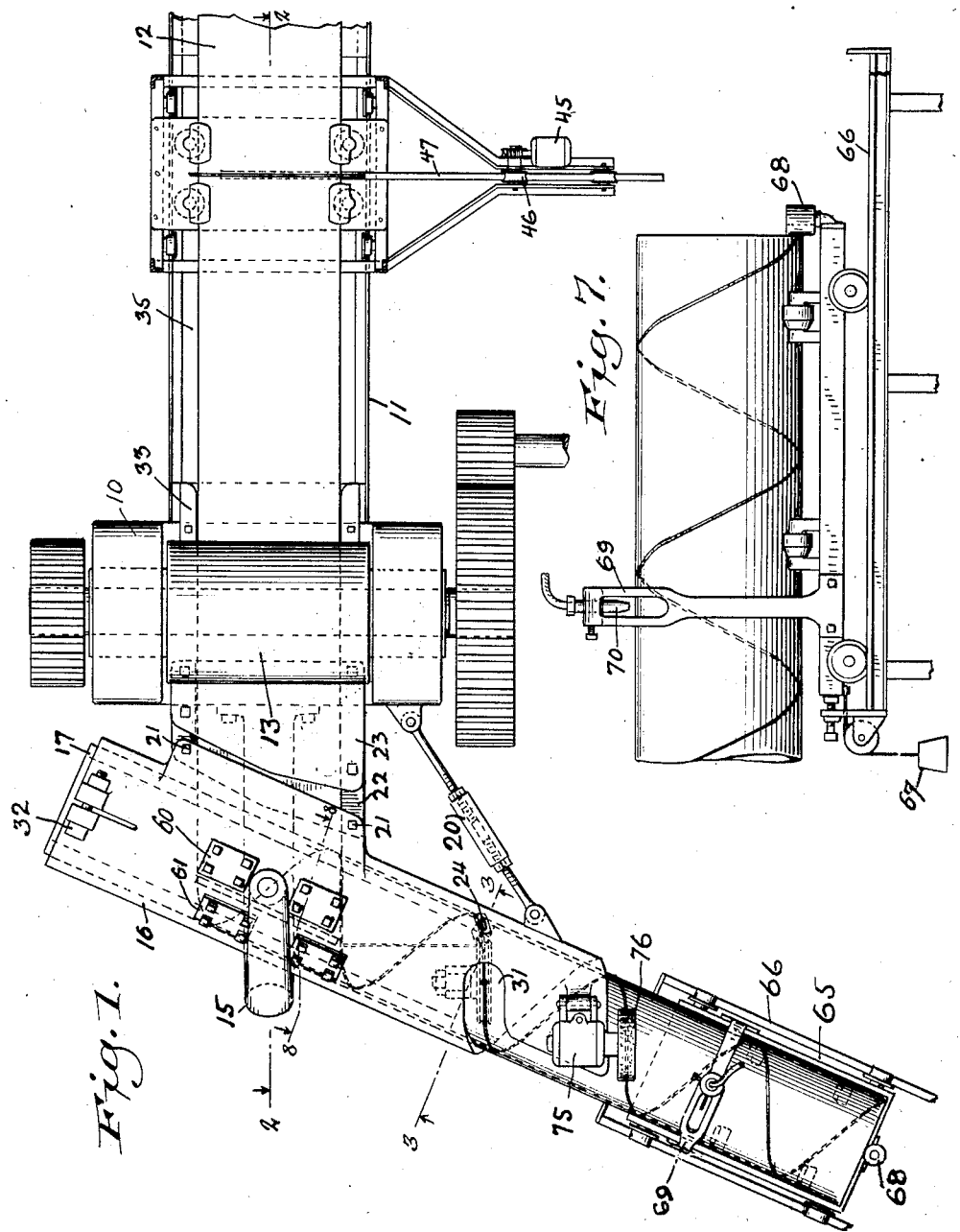

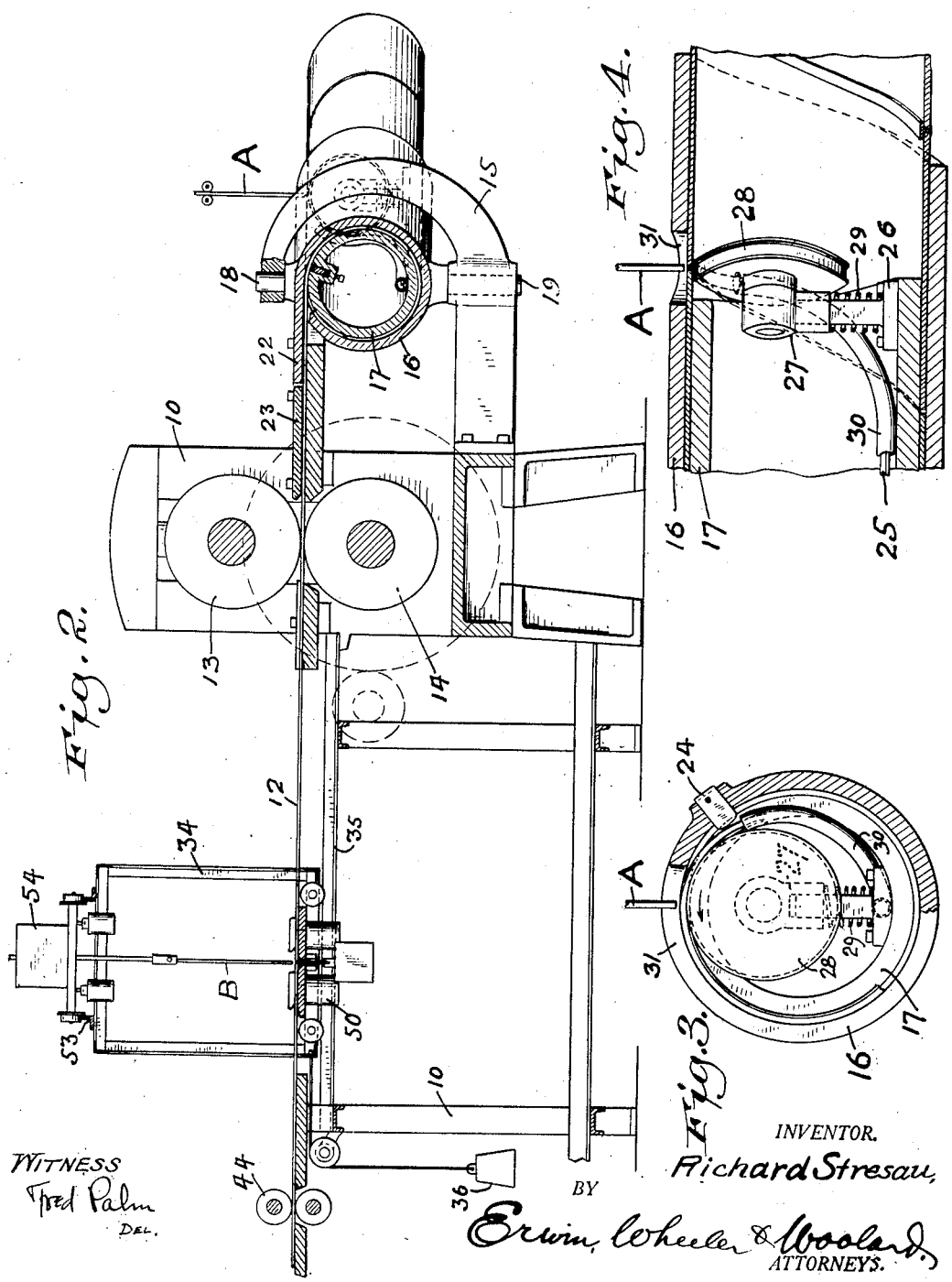

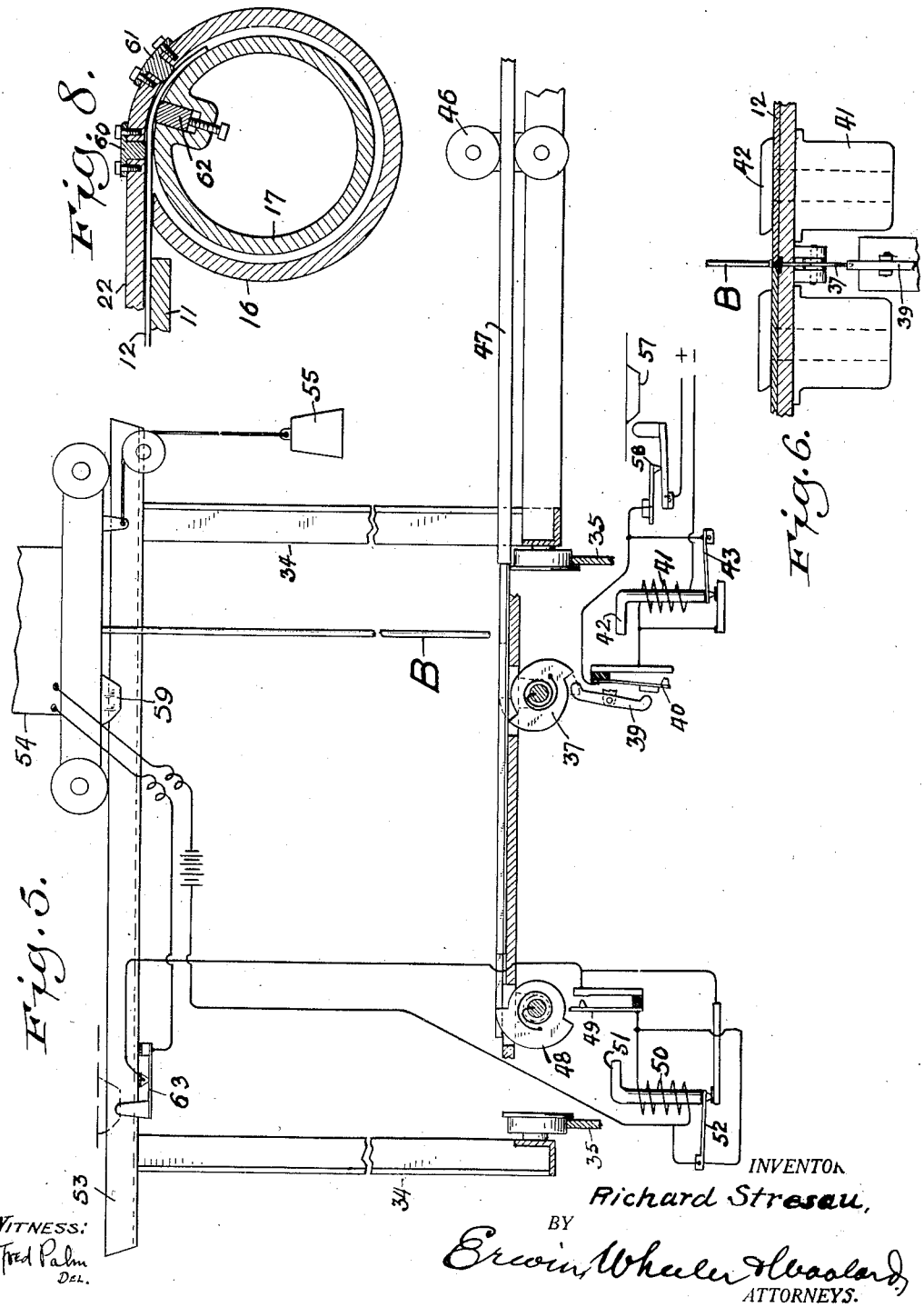

1,795,380

UNITED STATES PATENT OFFICE

RICHARD STRESAU, OF WAUWATOSA, WISCONSIN, ASSIGNOR, BY MESNE ASSIGNMENTS, TO AMERICAN ROLLING MILL COMPANY, OF MIDDLETOWN, OHIO, A CORPORATION OF OHIO

APPARATUS FOR MAKING SPIRAL TUBING BY ELECTRIC WELDING

Application filed March 26, 1923. Serial No. 627,599.

My invention relates to an improved apparatus designed specifically for making spirally welded pipes and tubes, but is susceptible of general application to the manufacture of spirally welded tubular articles.

The invention comprises means for positively feeding a flat strip of sheet metal into tube forming devices and automatically forming the same into a spirally wound tube with the convolutions extending in the same plane while undergoing such feeding movement, in combination with welding devices in the operation of which the abutting or contiguous edges of the spirally wound strip, as the latter is formed into a tube, are united by electric arc welding along the spiral line, so as to constitute an integral tubular structure with a finished exterior surface.

The invention comprises also means for permanently connecting the rear end of one metal strip to the forward end of a succeeding strip by a transverse welding operation, so that as the first strip is consumed in the process of converting it into tubular form, the operation of tube forming is not interrupted but may be continued indefinitely, by reason of the provision of means for continuing the supply of strip material. The linear extent of the tubular product is not therefore limited by the length of a single strip, but the length of strip material available for the purposes of my invention is indeterminate.

The invention comprises also means for welding transversely of the strip the abutting ends of the strips in succession and without interruption of the tube forming operation, as well as means for welding the abutting or contiguous edges of the strip during the formation of the latter into a spirally wound tube. In connection with the transverse welding, I provide means for clamping the contiguous ends of the strips in succession, so that the latter are held in proper position for the performance of the transverse welding operation.

Preferably, but not necessarily, means are provided also for inserting L-shaped chill strips at both the spiral and transverse welding lines, the chill strips, which furnish additional welding material, being fused and incorporated as part of the welded joint in each case. The devices for supplying the chill strip to the spiral weld are operated in consonance with the continuously operating tube forming and spiral welding devices, while those for supplying the strip to the transverse weld are operated periodically, and only when it becomes necessary to unite the abutting ends of the succession of strips.

Provision is made also for grinding the surplus metal away from the spiral welding line as the tube is being formed, so that a finished and smooth exterior surface is produced during the manufacture of the tube.

Means are provided also whereby the continuously formed and completed tube of indefinite length may be cut into sections of predetermined length during the process of manufacture of the tube, the cutting being performed without interruption of either of the tube forming or welding operations.

Other features residing in my present invention will be more specifically referred to hereinafter, and the novelty of the invention will be pointed out in the appended claims.

In the drawings attached and forming part hereof:

Figure 1 is a plan view showing the general arrangement of the devices in which my invention has been embodied.

Fig. 2 is a vertical sectional view on the line 2—2, Fig. 1, looking from the top of Fig. 1 in the direction of the arrows.

Fig. 3 is a vertical section transversely of the apparatus on the line 3—3, Fig. 1, near the point where the spiral welding is performed.

Fig. 4 is a vertical central section taken longitudinally of the tube forming and spiral welding means at the same point.

Fig. 5 is a rear view in elevation of the travelling mechanism employed for transversely welding the contiguous or abutting ends of the succession of metal strips, the said view looking to the right of Fig. 1 and the left of Fig. 2.

Fig. 6 is an enlarged view in elevation corresponding to the view at the left of Fig. 2, and showing in detail the arrangement of some of the devices employed in the same connection.

Fig. 7 is a diagrammatical view in elevation showing the manner of mounting the travelling means operating in conjunction with the apparatus to cut the spirally welded tubing or circumferential lines into sections of the desired length.

Fig. 8 is a transverse section on the line 8—8, Fig. 1, showing the arrangement of the radially adjustable pressure points which direct the metal strip during its tubular formation.

In the drawings, the frame 10 supports the table 11, over which passes the flat metal strip 12, which is to be automatically converted into tubular form by spiral winding, the abutting edges of the said strip being always disposed in spiral formation therefor, and united by electric arc welding along the spiral line of such winding. Journaled in bearings in the frame 10 are positively acting, continuously driven feed rollers 13 and 14, geared so as to rotate in unison, and engaging the opposite surfaces of the strip 12, so as to advance the strip into the tube forming devices, whereby the strip is converted into its tubular form with a spiral seam. The operation of the continuously driven rollers 13 and 14 is such that the metal strip 12 is advanced at a uniform rate of speed by positive action, and is made to assume its tubular form under the pressure exerted by the feed rollers.

In order that the flat metal strip thus fed through the machine may be converted into an elongated or wide annulus of spiral construction with its edges in proximity and the convolutions thereof in the same longitudinal plane, I arrange on a bracket 15 carried by the frame 10, a tubular casing or shell 16, the interior diameter of which is equal to the exterior diameter of the tube to be produced. Adjustably mounted at one end within the tubular casing 16, but in fixed relation thereto, is a hollow cylindrical mandrel 17, the adjacent tube shaping surfaces of the casing 16 and the mandrel 17 being concentrically positioned with respect to each other, but separated by an open circular space sufficient only to permit the free passage of the strip 12 through the said space, so as to conform the convolutions of the strip into the exact annular state desired, and prevent overlapping of the edges.

As shown in Fig. 2, the bracket 15 at its outer end is curved upwardly and returned so as to form a yoke and provide vertically disposed aligned bearings for the journals 18 and 19, formed upon the casing 16. The casing 16 with its adjunctive devices may therefore be rotated upon its vertical axis so as to be adjusted in a horizontal plane and set at any divergent angle with relation to the line of movement of the strip 12. By means of this provision for adjustment, the edges of the strip at the time of completing the spiral tubular formation may be given such pitch and be brought into such exact proximity and relation that conditions conducive to a most favorable and effective welding operation may be attained. A tie bar 20, which may be conveniently formed as a turn buckle, is connected at one end with an ear on the swiveled casing 16, and at the other end with an ear on the frame 10, whereby the desired adjustment of the casing may be effected with precision, and thereafter maintained during the operation of the apparatus. Bolts 21, 21, passing through a web 22 extended from the top of the casing 16, and threaded into the table 11 also serve to further maintain the casing 16 in its adjusted position. A guard plate 23 is mounted on the table 11, just in advance of the feeding rollers 13 and 14, a channel being formed between the table and the web 22 and guard plate 23, for insuring the proper advancing movement of the metal strip 12, thus overcoming any tendency of the plate to buckle under the force exerted by the feed rollers and resisted by the tube shaping elements of the apparatus.

The casing 16 is provided with a radial opening which is coincident with the meeting line of the edges of the metal strip in the formation of the first convolution thereof. Projecting through the said opening and slightly into the interior of the casing, is an adjusted thin metallic spacer 24, having a thickness which will produce and maintain a slight separation of the edges of the strip as the convolution is formed, the purpose in producing such separation of the edges being to enable the insertion of a welding and cooling strip 25, into the welding groove from the inside of the tube. Such welding strip 25 is rolled into the form of a ⊥, the upstanding stem of which is forced into the space separating the convolutions of the pipe just in advance of the spacer 24, so that such welding strip may be fused into the joint in the welding operation, which commences immediately, and becomes a permanent part of the welded joint. In addition to its purpose in supplying additional metal for the welded joint, the said strip acts as a cooling medium to reduce the temperature of the parts and obviate sticking to the stationary mandrel 17 or burning the metal at the welding line. In the welding operation, the stem of the strip 25 is fused with the edges of the coiled strip 12 and incorporated into the weld, while the base or lower flat surface forming the bottom of the strip lies interiorly of the tube against the spiral joint formed therein.

In order to feed the welding strip 25 as the operation of welding proceeds, I mount a post 26 interiorly of the mandrel 17 at a point under the welding line. A sleeve 27 is mounted for vertical movement upon the post 26, and in the sleeve 27 is mounted a lateral stub shaft carrying a feed wheel 28, mounted to rotate in the vertical plane of the welding line, and which is adapted to bear against the inner side of the tube at the point where the welding is performed, to hold the welding strip 25 in proper position with respect to the space separating the convolutions of the strip 12 and the edges to be welded. An expansion spring 29 surrounds the post 26 and exerts a pressure on the sleeve 27, which will be sufficient to engage the periphery of the feed wheel 28 with the interior of the tube, through the strip 25, such engagement being frictional in a degree which will effect the coincident rotation of the wheel 28 with that of the tube as the latter is being formed. The welding strip is entered at the open end of the mandrel 17, that is, the end appearing at the top of Fig. 1, and is directed to the wheel 28 by means of a tubular guide 30, and is automatically fed or drawn into position by the conjoint rotation of the feed wheel 28 and the spiral tube which is being formed.

The casing 16 is cut away for a portion of its circumference so as to form an opening or recess 31, the sides of which may be parallel to the traveling welding line. The purpose of the said recess 31 is to provide a clearance in which the weldrod A may enter, so as to perform the welding operation upon the contiguous edges of the spirally wound strip. The feeding wheel 28 is located immediately underneath the recess 31. The tubular mandrel 17 is clamped at its rear or inoperative end in the casing 16 by means of a bolt 32 which bridges an axially extending slit in the casing 16, so that the said mandrel may be accurately adjusted and maintained as to its position in the casing.

The table 11 may be provided with longitudinal guides 33, 33, for properly directing the metal strip 12 into the apparatus. A strip 12 upon being laid upon the feed table 11 is entered between the feeding rollers 13 and 14, and thereafter positively fed by such rollers into the tube forming mechanism, to be converted into a spirally wound tube, and welded to form an integral structure in the manner before described. As a result of the great pressure exerted by the feeding rollers upon the metal strip, the latter is forced through the tube forming devices by a positive action, and caused to follow the contour of the casing and the mandrel. The latter being set at the desired divergent angle with relation to the line of movement of the strip, it follows from the arrangement that the metal strip will assume the annular form of the tube, with the convolutions extending in the same plane and with the edges in such contiguous or proximate relation, that the welding of such edges may be easily and completely effected.

In Fig. 8 I have shown an arrangement of radially adjustable devices designed to bear upon the advancing end of the metal strip 11, and to impart thereto the desired initial curvature to facilitate passage through the tube forming devices. The points are hardened so as to resist wear, and two of them, indicated 60 and 61, are arranged in radial openings formed in the casing or shell 16, being held in position by means of set screws threaded into the casing. Shims may be inserted between the casing and the heads of the points 60 and 61 to secure exact adjustment. The third point 62 is arranged in a similar manner in an opening formed in the mandrel 17, and adjustment thereof to the desired position is effected by means of a set screw threaded through a boss formed interiorly of the mandrel.

Welding devices are now so well known that it is not considered necessary to illustrate the arrangement of the same in the present connection, but such devices may be supported upon the casing 16 and participate in any adjusting movements thereof, so that the point of the weldrod A, which exemplifies the spiral welding devices, will always be traversed by the welding line in the rotation of the tube. I prefer to use a destructible weldrod, and to incorporate the molten metal flowing therefrom in the fusion of the edges of the spirally wound strip, together with the welding strip 25. But an ordinary electrode may be used to conduct the welding current and produce the arc in the welding operation, instead of a fusible weldrod, such as is preferably used by reason of the more satisfactory results attained by the latter.

As the rear end of the first strip 12 approaches the feed rollers, I bring into conjunction with it the forward end of a second strip, and by a transverse welding operation upon the meeting ends of the two strips, unite them into a single length, so as to enable the apparatus to operate continuously in producing the tube. The transverse welding apparatus is adapted to have a longitudinal movement with the metal strips, and to maintain the weldrod in a fixed position with relation to the transverse welding line. The transverse welding devices are connected or coupled to the strip at the right moment so as to permit forward movement therewith, while the point of the weldrod is traversing the welding line.

The transverse welding devices are mounted in a frame 34 supported on rollers which move over longitudinal tracks 35 fixed on the frame 10 adjacent the table 11, the frame 34 being normally held in its retracted position by means of a weight 36, or other means, but free to move forwardly when the resistance of the weight is overcome by the clamping action exerted upon the moving strip 12.

An oscillating spacer 37, which may be formed as a disc with opposite projections thereon, is pivoted in the frame 34 below the surface of the table 11, the axis of the spacer being parallel with the length of the table. The said spacer is rotated in one direction by means of a spring 38, coiled about the axis thereof, and serving to bring the upper projection of the spacer above the surface of the table. The presence of a metal strip upon the table 11 will depress the upper projection on the spacer below the level of the table, and hold it in that position while the said strip is being carried forward by the feeding rolls 13 and 14. When the rear end of the strip clears the spacer 37, the spring 38 will act to effect reverse rotation as before described. In the rotation of the spacer under the influence of the spring, the lower projection on the spacer will strike the end of a centrally pivoted lever 39, the other end of which engages a spring contact 40 and closes an electric circuit, which includes the coil of a magnetically operated clamp 41. The core of the latter is provided with a lateral extension 42 which is adapted in the energization of the coil to engage the forwardly moving strip 12. Thereupon, longitudinal movement of the frame 34 carrying the transverse welding devices is instituted. The movement of the core of the clamp 41 closes a shunt circuit so that the said clamp will remain operative, although the circuit be broken later at 40.

A pair of feeding rollers 44, designed to be brought into action simultaneously with the initial movement of the frame 34, now commences the forward feeding movement at an accelerated rate of speed of a second metal strip, the motor operating the rollers 44 being energized in the closing of the clamping circuit.

The frame 34 also carries devices which are designed to feed a section of welding strip or chill similar in formation to that used in performing the spiral weld upon the tubular structure before described, the said chill strip being adapted to be positioned between the meeting ends of the two strips 12, as shown in Fig. 6, a groove being formed in the table of the frame 34, for guidance thereof. A motor 45 mounted upon an extension of the frame 34, and in the circuit of the clamp 41, is operated to drive through a worm and gear, the chill strip feeding rollers 46, the latter giving forward movement to a ram or driver 47 which will push the chill strip into its position between the contiguous ends of the strips 12. The end of the chill strip in the movement toward final position, will rotate the spacer 37 in the opposite direction against the force of the spring 38, thus breaking the circuit at 40, although effectiveness of the latter is maintained through the shunt before described. The forward end of the second strip 12 is meantime being advanced into proximity with the rear end of the first strip 12, so as to leave a narrow space between such ends, which is entered by the stem of the chill strip, the continued movement of the second strip 12 closing the space between the ends of the strips 12 and engaging the chill strip between such ends. When the second strip 12 has completed its forward movement, the rollers 44 will slip over the surface of the plate.

In the final movement of the chill strip into position between the ends of the tube forming strips 12, the end of the chill strip will contact with a projection on a disc 48 mounted on the frame 34, so as to oscillate in the manner described with reference to the spacer 37, the said disc 48 being rotated to a normally inoperative position by means of a spring coiled about the axis thereof. Rotation of the disc 48 in the other direction by the final movement of the chill strip will cause a lower projection on the disc 48 to pass the switch 49 and momentarily close a circuit. Such closure will energize the coil of a magnetic clamp 50, the core of which is provided with a lateral extension 51 which is adapted to engage and hold down the forward end of the second strip 12, so that both strips are now clamped to the frame 34 of the transverse welding devices. The movement of the core of the clamp 50 closes a shunt circuit at 52, so that the clamping action is maintained during the transverse welding operation after the lower projection on the disc 48 passes by the switch 49 and the circuit is broken. Clamps 41 and 50 are provided at each side of the line of travel of the strips 12.

At the end of the feeding movement of the chill strip, the rollers 46 release their hold upon the ram 47 so that the latter may return to initial position by a counterweight or other means.

The upper part of the frame 34 supports tracks 53, along which travel a head 54 carrying the transverse welding devices, the head 54 being motor actuated to traverse the welding line, and at the completion of the welding operation is returned to the initial position by means of a counter weight 55. The transverse welding devices carried by the head 54, and exemplified by the weldrod B, may be of any suitable construction, such as will serve to feed a fusible weldrod in the ratio of the consumption of the latter while the welding is taking place. A wiper 57, adapted to interrupt the several feeding movements and open the circuit of clamp 41 at 58, to de-energize the coil of the said clamp, and a wiper 59, adapted likewise to break the welding circuit at 63 and to de-energize the clamping coil 50 are carried by the welding head 54, and operate at the moment that the weldrod 56 has completed its movement over the welding line. The parts assume their normal inoperative positions, in which they remain until the time arrives for making another transverse weld, when the operations are repeated. In this welding operation, I may use an electrode in conducting the arcing current, but a fusible weldrod is preferable.

The apparatus as a whole is designed to operate continuously in the production of spirally welded metal pipe, but it is obvious that the continued formation of such pipe will cause it to flow laterally from the apparatus in such a length as to present a problem in taking care of the output in an efficient manner. In order to meet the exigency, I have installed means whereby the spirally welded pipe during its production may be cut transversely upon circumferential lines, so as to produce tubular sections of the desired lengths. Such cutting of the pipe is effected automatically without interruption of the pipe forming and welding operations. In order to achieve the purpose of this feature of my invention, I arrange in a position parallel to the path of movement of the pipe, a traveling carriage 65 movable on a track 66, the said carriage being provided with a counter weight 67 to hold it in retracted position, and with a stop 68 which is engaged by the forward edge of the pipe in the outward movement of the length thereof.

Mounted also on the carriage is a bracket 69 which supports a torch 70, to which a suitable conductor may lead for conveying the combustion element to the line on which the pipe is to be severed. The stop 68 may be in the form of a roller, mounted for rotation upon a post attached to the frame of the carriage 65, so that in the advancing movement of the pipe section the said roller will be engaged by the forward edge thereof as the pipe is rotated, so as to advance the carriage in the same ratio. Therefore, the flame of the torch will be maintained in relatively fixed position in a line about the circumference of the pipe. With each revolution of the pipe a section thereof will be severed on the circumferential line upon which the flame of the torch plays. Upon removal of the severed section, the carriage 65 will return to its rearward position with the stop 68 in engagement with the newly formed front edge of the advancing pipe. The carriage 65 may be made to control the flow of the burning mixture by convenient means as desired, and which it is not necessary to illustrate in this connection. The relatively slow rate of rotation of the pipe during its formation, enables the flame to make a comparatively clean cut on the line of severance.

While the apparatus as constructed performs the spiral welding operation completely and satisfactorily, it occurs occasionally that a slight excess of metal is deposited by the fusing weldrod upon the spiral welding line, roughening the outer surface of the tube. In order to remove such excess of metal and turn out the spirally welded pipe with a smooth exterior, I mount a motor 75 carrying a grinding wheel 76, which is positioned so as to operate over and upon the welded joint, and grind away any surplus material which may have been deposited thereon. Provision for the radial adjustment of the grinding wheel with relation to the exterior surface of the pipe should be made, in order that the work may be most efficiently performed.

In constructing the tube forming devices, I have found that the best results can be attained by the use of the mandrel and casing described, which are spaced concentrically from each other a distance which is merely sufficient to permit the free passage of the strip through the tube forming devices. By following this arrangement the convolutions formed from the strip are directed absolutely as desired, and over-lapping of the edges thereof is prevented. The position of the spacer 24 determines the location of the spiral welding line, by lining up the edges with the point of the weldrod. Operating together, the devices referred to insure the proper presentation of the edges of the strip in correct position for welding. The path of the strip in assuming its circular course is therefore fixed, and the material is firmly held at the welding line, so that any warping or distortion in the formation is obviated. The resulting product is therefore exuded from the forming device with a perfect contour in so far as its longitudinal planes are involved.

But owing to the tendency of the metal strip, under the pressure exerted by the feeding rollers, to closely follow the interior outline of the casing 16, and until it reaches the welding point, it is not necessary in all cases to employ a mandrel as a part of the tube forming device, for the reason that the tube can be produced with the same degree of perfection by an apparatus from which the mandrel has been omitted. However, the mandrel forms a convenient element of the construction, in that it affords a support for some necessary adjuncts.

The speed at which the apparatus illustrated may be operated in its entirety is determined by the time within which the spiral welding operation can be performed. The strip feeding rollers and the transverse welding devices for connecting the ends of a succession of strips, the latter devices having for their purpose to constitute a continuous supply of tube forming material, are capable of operating at a much greater relative speed in the performance of their functions. I may in some instances dispense with the spiral welding devices as a part of the equipment of the tube forming apparatus. This will enable a very rapid production of the tube to be made, which in the forming operation may be severed into sections, as before described, with ample time for the transverse welding operations. Such sections may then be distributed to a plurality of machines constructed especially to complete the tubular structures by welding along the spiral lines thereof, in the time required for the slower operation. By this means, a greater output can be secured than is possible in a single, completely equipped tube forming and welding apparatus.

The invention is susceptible of other modification in many particulars of construction, but I regard all of such modifications as within the scope of my invention.

The process herein disclosed is the subject-matter of the claims of a divisional application filed by me on February 9, 1925, Serial No. 8,071.

The tube forming mechanism herein disclosed, is, per se, the subject-matter of the claims of Patent No. 1,523,927, granted January 20, 1925, to John D. Beebe.

Having thus described my invention, what I claim and desire to secure by Letters Patent of the United States, is:

1. In an apparatus for manufacturing spirally welded pipe from a metal strip, a cylindrical mandrel, and a concentrically arranged tubular casing, the latter being spaced from the mandrel at all points in the line of movement of the strip a distance sufficient to permit free advancing movement of the said strip through such space, the mandrel and casing being arranged at an angle with relation of the line of travel of the strip to cause the latter in its movement to assume a spiral form in combination with feed rollers which act positively to force the strip through the said space, and devices for welding the edges of the strip along the spiral lines thus formed, to constitute an integral tubular structure.

2. In an apparatus for manufacturing spirally welded pipe from a flat metal strip, a tube forming device comprising a cylindrical mandrel and a casing surrounding the same and spaced concentrically therefrom to constitute a circular passage for the metal strip and prevent overlapping of the edges thereof, said tube forming device being arranged at an angle with relation to the line of movement of the strip, whereby the coils of the latter are brought into the same longitudinal plane with the edges of the strip in abutting proximity, and means for advancing the strip through the forming device, in combination with means for welding the strip on the spiral line formed by the said edges.

3. In an apparatus for making spirally welded pipe from a flat metal strip, a tube forming device comprising a cylindrical mandrel and a casing surrounding the same and spaced therefrom to form a circular passage for the metal strip, means for advancing the strip through the forming device, and means for adusting the forming device at an angle with relation to the line of movement of the strip, whereby the coils of the latter are brought into the same plane with the edges in abutting relation, in combination with means for electrically welding the strip on the spiral line formed by the said edges while the tube is being formed.

4. In a tube making machine, devices for imparting a spirally wound tubular form to a strip of sheet metal, means for feeding the strip into the tube forming devices, a fusible weldrod for conducting the welding current and supplying welding material to the spirally welded joint, and means for supplying additional welding material to the joint.

5. In a tube making machine, devices for imparting a spirally-wound tubular form to a strip of sheet metal, continuously operating means for feeding the strip into the tube forming devices, means for feeding a chill strip in the spiral winding line of the tube, and a synchronously operating welding device to fuse the chill strip and the edges of the sheet metal strip as the tube is formed and weld the whole into an integral structure.

6. In a tube making machine, devices for imparting a spirally-wound tubular form to a strip of sheet metal with the convolutions in the same plane, means for feeding the strip into the forming devices, and means for electrically welding the tube along the spiral line formed by the edges of the strip, in combination with automatically operating devices to weld the abutting ends of a succession of strips to produce a continuous supply of tube forming material, and means for inserting additional material in the weld at such abutting ends.

7. In a machine for making spirally-wound welded pipe, a mandrel and a casing supported concentrically about the same to constitute a circular passage for a metal strip, means for feeding the strip into the said passage to convert the strip into tubular form with the convolutions in the same longitudinal plane and the edges in abutting proximity, and means supported on the mandrel for inserting a chill strip between such edges, in combination with electrical welding devices operating to fuse the said strip and edges and weld them together along the spiral line.

8. In a machine for making spirally-wound welded pipe from a metal strip, means for converting the metal strip into tubular form with the convolutions in the same longitudinal plane and the edges in abutting proximity, means for maintaining the adjacent edges in slightly separated relation, and means for inserting a chill strip between the said edges, in combination with electrical welding devices adapted to fuse the said strip and edges and weld them together along the spiral line.

9. In a machine for making spirally-wound welded pipe from a metal strip, means for converting the metal strip into tubular form with the convolutions in the same longitudinal plane and the edges in abutting proximity, means for maintaining the adjacent edges in slightly separated relation, and means for inserting a chill strip between the said edges, in combination with electrical welding devices adapted to fuse the said strip and edges and weld them together along a spiral line, the said welding devices including a current conducting weldrod which is fused by the electric current, the molten metal flowing from the weldrod being incorporated in the welded joint.

10. In a tube making machine, devices for imparting a spirally-wound tubular form to a metal strip, and continuously operating means for feeding the strip into the tube forming devices, in combination with synchronously operating electric welding devices for fusing and uniting the spirally disposed edges of the strip, and continuously operating means positioned at the spiral welding line for removing the surplus metal from the exterior surface of the tubes as the latter is formed.

11. In a machine for making spirally-wound tubing, means for feeding a metal strip, a tube forming device arranged at a divergent angle with relation to the line of movement of the metal strip and provided with a circular path which is followed by the strip in its advancing movement, whereby the strip is converted into tubular form with the convolutions in the same plane and the edges in abutting relation, in combination with means for welding the tube exteriorly along the spiral line of the latter, and means for supplying a chill strip at the welding line interiorly of the tube for incorporation in the welded joint.

12. In a device for rolling and welding a strip of sheet metal in a spiral, an open-ended cylinder arranged to receive said strip on its interior; an electrode carried over the extremity of said cylinder and arranged to form an electric arc with said strip as it emerges from said cylinder; a wheel arranged to contact with said strip on the interior of said spiral substantially under said electrode and means for forcing said strip into said cylinder.

13. In a device for rolling and welding a strip of sheet metal in a spiral, an open-ended cylinder arranged to receive said strip on its interior; an electrode carried over the extremity of said cylinder and arranged to form an electric arc with said strip as it emerges from said cylinder; a wheel arranged to contact with said strip on the interior of said spiral substantially under said electrode; spring means for holding said wheel in contact with said strip and means for forcing said strip into said cylinder.

In testimony whereof I have signed my name at Milwaukee this 23d day of March, 1923.

R. STRESAU.